J. HOUSTON.
Churn.
No. 40,623.
Patented Nov. 17, 1863.
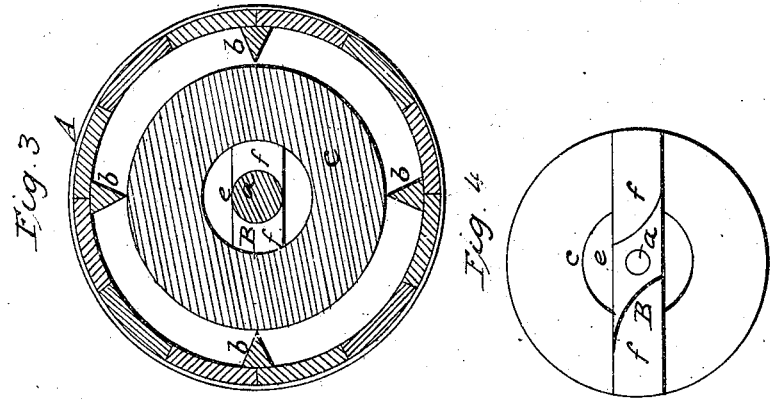
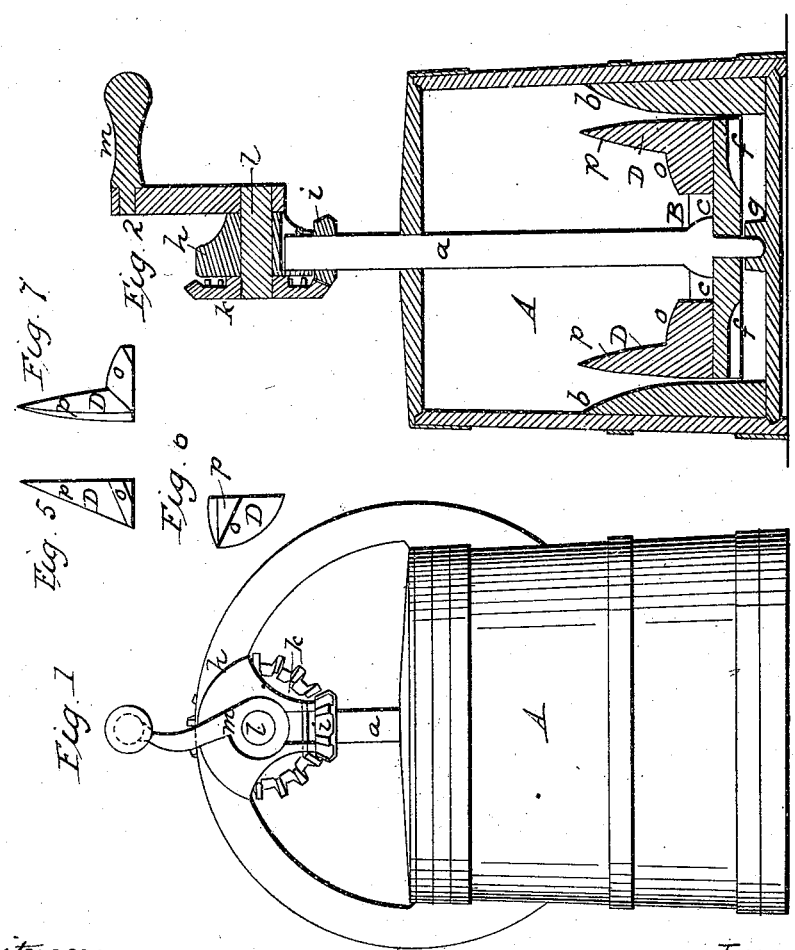
Witnesses.
Inventor.

UNITED STATES PATENT OFFICE.

JOHN HOUSTON, OF LAKE VILLAGE, NEW HAMPSHIRE.

IMPROVEMENT IN CHURNS.

Specification forming part of Letters Patent No. 40,623, dated November 17, 1863.

*To all whom it may concern:*

Be it known that I, JOHN HOUSTON, a resident of Lake Village, in the county of Belknap and State of New Hampshire, have invented a new and useful Improvement in Churns; and I do hereby declare the same to be fully described in the following specification, and represented in the accompanying drawings, of which—

Figure 1 denotes a front elevation, Fig. 2 a vertical section and Fig. 3 a horizontal section, of a churn provided with my invention.

In the drawings, A denotes the tub or reservoir, and B the dasher of the said churn, the said tub or reservoir being a vessel circular in its horizontal section. The dasher is to revolve within the tub or reservoir, and is affixed to a vertical shaft, *a*, which is arranged with its axis coincident with that of the reservoir and is pivoted in a step arranged on the bottom of the latter. The interior curved surface of the tub has a series of ribs, cleats, or current-breakers, *b b b b*, affixed to and extended from it, as shown in Figs. 2 and 3.

The dasher is composed not only of a flat annulus or perforated disk, *c*, but of two or any other suitable number of arms, D D, raised or arranged thereon, and being formed as shown in the drawings, there being a round hole or passage, *e*, between the said arms and through the disk *c*. One or more arms, *f f*, are fixed to the under side of the disk *c* and radiate from the shaft *a*, as shown in Figs. 2 and 4, the latter figure being a bottom view of the disk. These arms *f f* are intended for a double purpose—that is to say, they not only answer to scrape the butter from the bottom of the reservoir or to keep the butter as it may be formed from adhering thereto, but they produce rotary and centrifugal motions of the cream, which may be below the dasher while the churn may be in operation. The lower end of the shaft *a* rests in a step, *g*, while the upper end has a bearing at the crown, of an arched frame or handle, *h*, which goes over the tub or reservoir, as shown in Figs. 1 and 2. A beveled pinion, *i*, carried by the shaft *a*, engages with a beveled wheel, *k*, affixed to a horizontal shaft, *l*, to which a crank, *m*, is applied, the whole being arranged as shown in the drawings. By turning the crank the arms D D *f f* will be put in motion or rotation. Their operation on cream when within the reservoir will be such as to cause it to have a centripetal movement above the disk *c* and a centrifugal movement underneath it. The cleats or current-breakers *b b* serve to arrest rotary motion of the cream while it may be rising upward from the periphery of the disk *c*.

In consequence of the peculiar form of each arm D D of the dasher, it being made as shown in Figs. 5, 6, and 7, (the first of the said figures being a front elevation, the second a top view, and the third an inner end elevation of one of the said arms D D,) the cream will not only be separated in a circular path and spread laterally therefrom in opposite directions, but it will be lifted or thrown up more or less just within the circle of rotation of the said arms, the lifting of the cream being effected by the slope or cam *o* of each arm, which operates to generate centripetal movements of the cream. The said slope *o* of each arm I term a "riser" or "cam," because while in rotation it serves to throw up or raise the cream and cause it to flow toward the shaft or produces or materially aids in producing the centripetal motion. The part *p* of each arm is triangular in its horizontal section and operates to plow through the cream and force it laterally in opposite directions. The body of cream which is thrown by it toward the inner curved surface of the tub will impinge against the cream which may be rising up from the periphery of the disk *c* and will operate to arrest such upward movement, and thus contribute to prevent the cream from being thrown out of the tub while the dasher may be in rapid revolution. The movements and counter movements produced within the cream will be such that it will not only be speedily and effectually churned, but during very rapid revolution of the dasher such cream will not be thrown out of the tub.

What I claim as my invention is—

The improved churn as constructed not only with the series of cleats or current-breakers *b b b b*, arranged within its tub, as specified, but with the dasher composed of the flat annulus or perforated disk *c*, the horizontal arms *f f*, and the vertical arms D D, made and arranged together in manner and so as to operate substantially as described.

JOHN HOUSTON.

Witnesses:
F. P. HALE, Jr.,
C. H. BEAN.